United States Patent
Ueda et al.

(10) Patent No.: US 12,264,236 B2
(45) Date of Patent: Apr. 1, 2025

(54) RUBBER COMPOSITION FOR SEALING MATERIAL AND SEALING MATERIAL USING THE SAME

(71) Applicant: VALQUA, LTD., Tokyo (JP)

(72) Inventors: Akira Ueda, Gojo (JP); Sayaka Yoshida, Gojo (JP); Ryohei Nishihara, Gojo (JP)

(73) Assignee: VALQUA, LTD., Tokyo (JP)

( * ) Notice: Subject to any disclaimer, the term of this patent is extended or adjusted under 35 U.S.C. 154(b) by 652 days.

(21) Appl. No.: 17/442,194

(22) PCT Filed: Mar. 6, 2020

(86) PCT No.: PCT/JP2020/009615
§ 371 (c)(1),
(2) Date: Sep. 23, 2021

(87) PCT Pub. No.: WO2020/195696
PCT Pub. Date: Oct. 1, 2020

(65) Prior Publication Data
US 2022/0186010 A1    Jun. 16, 2022

(30) Foreign Application Priority Data

Mar. 26, 2019   (JP) .................................. 2019-058270

(51) Int. Cl.
| | |
|---|---|
| C08L 23/16 | (2006.01) |
| C08K 3/04 | (2006.01) |
| C08K 3/36 | (2006.01) |
| C09K 3/10 | (2006.01) |

(52) U.S. Cl.
CPC ............ *C08L 23/16* (2013.01); *C09K 3/1006* (2013.01); *C08K 3/04* (2013.01); *C08K 3/36* (2013.01); *C09K 2200/0208* (2013.01); *C09K 2200/0247* (2013.01); *C09K 2200/0494* (2013.01); *C09K 2200/0607* (2013.01); *C09K 2200/0617* (2013.01)

(58) Field of Classification Search
None
See application file for complete search history.

(56) References Cited

U.S. PATENT DOCUMENTS

| | | | | |
|---|---|---|---|---|
| 2009/0171000 | A1* | 7/2009 | Amemiya | C09K 3/10 524/451 |
| 2009/0326122 | A1 | 12/2009 | Sato et al. | |
| 2010/0240828 | A1 | 9/2010 | Sato et al. | |
| 2013/0090424 | A1 | 4/2013 | Ikari et al. | |
| 2014/0287340 | A1 | 9/2014 | Yamamoto et al. | |
| 2020/0200232 | A1 | 6/2020 | Ozaki et al. | |

FOREIGN PATENT DOCUMENTS

| | | |
|---|---|---|
| CN | 101203565 A | 6/2008 |
| CN | 102959004 A | 3/2013 |
| CN | 107805480 A | 3/2018 |
| CN | 110953415 A | 4/2020 |
| EP | 1840163 | 10/2007 |
| EP | 1840163 A1 | 10/2007 |
| EP | 1852902 A1 | 11/2007 |
| EP | 2833453 A1 | 11/2007 |
| EP | 1894969 A1 | 3/2008 |
| EP | 2267071 A1 | 12/2010 |
| EP | 2584002 A1 | 4/2013 |
| JP | 2000319012 A * | 11/2000 |
| JP | 2011-153220 A | 8/2011 |
| JP | 2012087254 A | 5/2012 |
| JP | 2013-72004 A | 4/2013 |
| JP | 2013229323 A | 11/2013 |
| JP | 2014-15575 A | 1/2014 |
| JP | 2015-108104 A | 6/2015 |
| JP | 2015-206002 A | 11/2015 |
| JP | 2020-51540 A | 4/2020 |
| KR | 10-0902268 B1 | 6/2009 |
| WO | 2003/104317 A1 | 12/2003 |
| WO | 2006/137420 A1 | 12/2006 |
| WO | 2007/145313 A1 | 12/2007 |
| WO | 2008/001625 A1 | 1/2008 |
| WO | 2017/204207 A1 | 11/2017 |

OTHER PUBLICATIONS

Rodgers, B., Tallury, S.S. and Klingensmith, W. (2023). Rubber Compounding. In Kirk-Othmer Encyclopedia of Chemical Technology. Retrieved on Oct. 28, 2024. (Year: 2023).*
Office Action dated Feb. 3, 2023, issued in counterpart CN Application No. 202080024501.7, with English translation. (14 pages).
International Search Report dated May 12, 2020, issued in counterpart International Application No. PCT/JP2020/009615 (2 pages).
Extended (Supplementary) European Search Report dated Nov. 30, 2022, issued in counterpart application No. 20776301.2. (8 pages).
Office Action dated Feb. 7, 2023, issued in counterpart JP Application No. 2019-058270, with English translation. (9 pages).
Office Action dated Jan. 13, 2025, issued in counterpart KR Application No. 10-2021-7033850, with English translation. (8 pages).

* cited by examiner

*Primary Examiner* — Richard A. Huhn
(74) *Attorney, Agent, or Firm* — WHDA, LLP

(57) ABSTRACT

Provided is a rubber composition for sealing material which contains 100 parts by mass of a rubber component, 50 to 140 parts by mass of silica, 1 to 20 parts by mass of a silane coupling agent, and 15 to 35 parts by mass of carbon black. The rubber component is preferably an ethylene-propylene-diene rubber.

6 Claims, No Drawings

RUBBER COMPOSITION FOR SEALING MATERIAL AND SEALING MATERIAL USING THE SAME

TECHNICAL FIELD

The present invention relates to a rubber composition for sealing material and a sealing material using the same.

BACKGROUND ART

A rubber seal of a device used for storing a high-pressure hydrogen gas has a problem that a blister phenomenon is apt to occur. The blister phenomenon is a phenomenon in which a gas permeating into a rubber material under a high pressure expands while staying in the rubber material under the influence of rapid depressurization at a high temperature, and ruptures the rubber material.

International Publication No. 2007/145313 (Patent Literature 1) and International Publication No. 2008/001625 (Patent Literature 2) disclose rubber compositions in which silica as a reinforcing material is blended in a silicone rubber. Japanese Patent Laying-Open No. 2015-206002 (Patent Literature 3) discloses a rubber composition obtained by blending carbon black in an ethylene-propylene-diene rubber (EPDM). Japanese Patent Laying-Open No. 2015-108104 (Patent Literature 4) discloses an EPDM O-ring in which carbon black and silica are blended. International Publication No. 2003/104317 (Patent Literature 5) discloses an elastic compound in which carbon black and microsilica are blended.

CITATION LIST

Patent Literatures

PTL 1: International Publication No. 2007/145313
PTL 2: International Publication No. 2008/001625
PTL 3: Japanese Patent Laying-Open No. 2015-206002
PTL 4: Japanese Patent Laying-Open No. 2015-108104
PTL 5: International Publication No. 2003/104317

SUMMARY OF INVENTION

Technical Problem

In a high-pressure hydrogen gas device, the pressure of hydrogen to be handled is increasing more and more, and thus a sealing material having more excellent sealability at a low temperature and a high temperature is required. However, a composition having excellent blister resistance at a high temperature has poor low temperature resistance (recoverability at a low temperature). A sealing material satisfying both the blister resistance and the low temperature resistance is not achieved.

An object of the present invention is to provide a rubber composition for sealing material capable of improving the sealability of a high-pressure gas at a high temperature and a low temperature, and a sealing material obtained by crosslinking the rubber composition.

Solution to Problem

The present invention includes the following:
[1] A rubber composition for sealing material containing:
  100 parts by mass of a rubber component; 50 to 140 parts by mass of silica; 1 to 20 parts by mass of a silane coupling agent; and 15 to 35 parts by mass of carbon black.
[2] The rubber composition for sealing material according to [1], in which the rubber component is an ethylene-propylene-diene rubber.
[3] The rubber composition for sealing material according to [2], in which the ethylene-propylene-diene rubber has a Mooney viscosity of 50 to 90 at 125° C. or 30 to 60 at 100° C., the Mooney viscosity measured in accordance with JIS K 6300-1: 2013, and contains 45 to 55 mass % of an ethylene-derived structural unit.
[4] The rubber composition for sealing material according to any one of [1] to [3], in which the silica is spherical.
[5] The rubber composition for sealing material according to any one of [1] to [4], in which the silica has an average particle size of 5 nm to 5 μm.
[6] The rubber composition for sealing material according to any one of [1] to [5], in which the rubber composition for sealing material does not contain a plasticizer.
[7] A sealing material comprising a crosslinked product of the rubber composition for sealing material according to any one of [1] to [6].

Advantageous Effects of Invention

The present invention makes it possible to provide a rubber composition for sealing material capable of improving the sealability of a high-pressure gas at a high temperature and a low temperature, and a sealing material obtained by crosslinking the rubber composition.

DESCRIPTION OF EMBODIMENTS

A rubber composition for sealing material contains:
[A] a rubber component;
[B] silica;
[C] a silane coupling agent; and
[D] carbon black. Hereinafter, components contained in the rubber composition for sealing material and optionally contained components will be described in detail.

[A] Rubber Component

Examples of the rubber component include an ethylene-propylene-diene rubber (EPDM), an ethylene-propylene rubber (EPM), a nitrile rubber (NBR; acrylonitrile butadiene rubber), a hydrogenated nitrile rubber (HNBR; hydrogenated acrylonitrile butadiene rubber), a butyl rubber (IIR), a fluororubber (FKM), and a silicone rubber (Q). EPDM, HNBR, and FKM and the like are preferable because they have good properties as the rubber for sealing material. The rubber component may be composed of only one component or may contain two or more components.

A sealing material obtained by crosslinking the rubber composition for sealing material causes no blister to occur in a high-temperature high-pressure cycle test at a temperature of 100° C. and a pressure of 100 MPa to be described later, which causes no gas leakage to occur. The sealing material obtained by crosslinking the rubber composition for sealing material causes no gas leakage in a low-temperature high-pressure cycle test at a temperature of −40° C. and a pressure of 100 MPa to be described later. Gas leakage in a low-temperature environment usually occurs due to deterioration in shape followability and recoverability of the sealing material. EPDM is a rubber having excellent low temperature resistance (recoverability at a low temperature), chemical resistance, and cleanliness and the like, and is less expensive than NBR, HNBR, FKM, and Q and the like, whereby EPDM is one of rubber components suitable for the application of the sealing material.

EPDM is a terpolymer composed of an ethylene-derived structural unit, a propylene-derived structural unit, and a diene monomer-derived structural unit. In EPDM, rubber properties can be controlled by adjusting a content ratio between the ethylene-derived structural unit and the propylene-derived structural unit. For example, when the ratio of the ethylene-derived structural unit is increased, the chemical resistance and degree of crystallinity (accordingly, mechanical strength) of the rubber tend to be increased. Meanwhile, when the ratio of the ethylene-derived structural unit is reduced, the molding processability and fluidity of the rubber tend to be decreased. In order to produce a high-quality molded article (sealing material) having better processability by injection molding, the fluidity of the rubber component to be used is preferably relatively low.

From such a viewpoint, the content of the ethylene-derived structural unit in EPDM is usually less than or equal to 70 mass %, preferably less than or equal to 55 mass %, and more preferably less than or equal to 51 mass %. When the content of the ethylene-derived structural unit is within the above range, good fluidity can be imparted to EPDM, and good low temperature resistance can be imparted to the sealing material.

Meanwhile, when the content of the ethylene-derived structural unit is excessively low, the tensile strength of the sealing material to be obtained is insufficient. Therefore, the content of the ethylene-derived structural unit in EPDM is usually greater than or equal to 40 mass %, preferably greater than or equal to 45 mass %, and more preferably greater than or equal to 48 mass %.

Specific examples of the diene monomer constituting EPDM include non-conjugated diene monomers such as 5-ethylidene-2-norbornene (ENB), dicyclopentadiene (DCPD), 1,4-hexadiene (1,4-HD), methyltetrahydroindene, 5-methylene-2-norbornene, cyclooctadiene, and dicyclooctadiene. Among them, ENB and 1,4-HD are preferably used because EPDM exhibits a good crosslinking rate (vulcanization rate) and the resulting sealing material also has excellent heat resistance. ENB is more preferably used because ENB particularly has an excellent crosslinking rate. As the diene monomer, only one monomer may be used, or two or more monomers may be used in combination.

The content of the diene monomer-derived structural unit in EPDM is usually greater than or equal to 1 mass %, and preferably greater than or equal to 2.5 mass %, from the viewpoint of improving the crosslinking rate and the molding processability of the rubber composition. The content of the diene monomer-derived structural unit in EPDM is usually less than or equal to 14 mass %, preferably less than or equal to 10 mass %, and more preferably less than or equal to 5.0 mass %, in consideration of the ease of deterioration in the sealing material due to a large amount of double bonds remaining after crosslinking.

The rubber component used in the rubber composition for sealing material has a Mooney viscosity at 125° C. [ML(1+4) 125° C.] of preferably less than or equal to 90, and more preferably less than or equal to 85. The Mooney viscosity at 125° C. is measured in accordance with JIS K 6300-1: 2013. The Mooney viscosity [ML(1+4) 125° C.] of the rubber component is preferably greater than or equal to 40, more preferably greater than or equal to 50, and still more preferably greater than or equal to 75. If the Mooney viscosity is too high, the processability of the rubber composition may be poor.

The rubber component used in the rubber composition for sealing material has a Mooney viscosity at 100° C. [ML(1+4) 100° C.] of preferably less than or equal to 60, and more preferably less than or equal to 50. The Mooney viscosity at 100° C. is measured in accordance with JIS K 6300-1: 2013. The Mooney viscosity [ML(1+4) 100° C.] of the rubber component is preferably greater than or equal to 30, more preferably greater than or equal to 35, and still more preferably greater than or equal to 40.

EPDM preferably has a Mooney viscosity of 50 to 90 at 125° C. or 30 to 60 at 100° C. The Mooney viscosity is measured in accordance with JIS K 6300-1: 2013. EPDM preferably contains 45 to 55 mass % of an ethylene-derived structural unit. When the EPDM is used as the rubber component, a sealing material having excellent followability in a lower temperature environment can be obtained. In such a sealing material, the leakage of a high-pressure gas does not occur even when a grease is not used at a temperature of −40° C. A greaseless sealing material having good sealability has high versatility because a use environment is not limited, whereby troubles at the time of maintenance (replacement of the sealing material and the like) are also reduced. Such a sealing material can seal a high-pressure gas even at a temperature of −45° C.

Specific examples of commercially available products of EPDM include "EPT" manufactured by Mitsui Chemicals, Inc., "Esprene" manufactured by Sumitomo Chemical Company, Limited, "EP" manufactured by JSR Corporation, and "KELTAN" manufactured by Lanxess, under trade names. Preferably, "Esprene 5361" and "Esprene 501A" manufactured by Sumitomo Chemical Company, Limited and the like having excellent low temperature recoverability can be used.

[B] Silica

Silica is highly filled in the composition for sealing material. Silica is highly filled, whereby hydrogen is less likely to enter into the sealing material, which can provide improved blister resistance of the sealing material. Silica has lower hydrogen absorptivity than that of carbon black, whereby silica is more usefully used for improving the blister resistance.

There can be used silica used as a filler that exhibits a reinforcing effect in a common general-purpose rubber. Silica is not particularly limited, and examples thereof include dry white carbon manufactured by a thermal decomposition method of halogenated silica or an organic silicon compound, or a method in which SiO vaporized by heating and reducing silica sand is air-oxidized, or the like, and wet white carbon manufactured by a thermal decomposition method or the like of sodium. As silica, dry white carbon is preferably used. Only one silica may be used, or two or more silicas may be used in combination.

Silica contains at least 70 mass % of a silica component ($SiO_2$). The specific surface area of silica is preferably 10 to 120 $m^2$/g, and more preferably 15 to 40 $m^2$/g.

Silica is preferably spherical. Conventionally, there is an upper limit on the amount of silica that can be blended in the rubber composition for sealing material, which makes it difficult to highly fill silica in the rubber composition. However, friction between spherical silicas is less than that of silicas having other shapes (for example, chain-like shape), which provides improved dispersibility, whereby silica can be highly filled in the rubber composition for sealing material. When a large amount of silica is contained, the low temperature resistance of the sealing material may be deteriorated, but when silica is spherical, the low temperature resistance are less likely to be deteriorated. This makes it possible to more easily achieve both the blister resistance and low temperature resistance of the sealing material. The term "spherical" includes not only a true sphere but also a slightly distorted sphere.

The average particle size of silica is preferably 5 nm to 5 μm, more preferably 10 nm to 1 μm, and still more preferably 50 nm to 200 nm, from the viewpoint of the suppression of aggregation, and smoothness. If the average particle size of silica is too large, the blister resistance and low temperature resistance of the sealing material may be deteriorated. The average particle size can be determined by, for example, performing morphological observation using a microscope, measuring the particle sizes of silica in an observation field by image analysis, and calculating the number average of the measured values.

The content of silica in the rubber composition for sealing material is 50 to 140 parts by mass, and preferably 80 to 140 parts by mass, based on 100 parts by mass of the rubber component. When the content of silica is too large, the low temperature resistance of the sealing material may be deteriorated.

[C] Silane Coupling Agent

The rubber composition for sealing material contains a silane coupling agent for highly filling silica. The silane coupling agent has a reactive group that chemically bonds to an inorganic material and a reactive group that chemically bonds to an organic material in the molecule, whereby the silane coupling agent has a role as a binder that connects the organic material and the inorganic material usually less likely to bond to each other. When the surface of silica is coated with the silane coupling agent, the surface of silica becomes hydrophobic, which makes it possible to prevent the aggregation of silica. As a result, silica can be further dispersed and highly filled in the rubber composition for sealing material, whereby the blister resistance of the sealing material can be improved. The silane coupling agent also increases a bonding force between silica and the rubber component to improve the blister resistance.

The silane coupling agent is not particularly limited, and examples thereof include vinyl-based, acryl-based, epoxy-based, mercapto-based, and amino-based silane coupling agents.

Examples of the vinyl-based silane coupling agent include vinyltrichlorosilane, vinyltrimethoxysilane, and vinyltriethoxysilane. Examples of the acryl-based silane coupling agent include 3-acryloxypropyltrimethoxysilane. Examples of the epoxy-based silane coupling agent include 2-(3,4-epoxycyclohexyl)ethyltrimethoxysilane, 3-glycidoxypropylmethyldimethoxysilane, 3-glycidoxypropyltrimethoxysilane, and 3-glycidoxypropylmethyldiethoxysilane. Examples of the methacryl-based silane coupling agent include 3-methacryloxypropyltrimethoxysilane, 3-methacryloxypropyldiethoxysilane, and 3-methacryloxypropyltriethoxysilane. These silane coupling agents can be used alone or as a mixture of two or more thereof.

The content of the silane coupling agent in the rubber composition for sealing material is 1 to 20 parts by mass, and preferably 1 to 10 parts by mass, based on 100 parts by mass of the rubber component. The rubber composition for sealing material contains a larger amount of the silane coupling agent than before, whereby the blister resistance of the rubber composition for sealing material is improved. However, when the amount of the silane coupling agent is too large, the elongation of the sealing material is extremely lowered, which may cause breakage during use or deteriorated low temperature resistance.

[D] Carbon Black

The rubber composition for sealing material contains carbon black. The rubber composition for sealing material contains carbon black, whereby the strength and blister resistance of the sealing material can be improved.

The content of carbon black is 15 to 35 parts by mass based on 100 parts by mass of the rubber component. From the viewpoint of retaining a co-crosslinking agent, the content of carbon black is preferably greater than or equal to 20 parts by mass based on 100 parts by mass of the rubber component. However, carbon black adsorbs hydrogen, whereby carbon black blended in a large amount may cause deteriorated blister resistance. The total content of silica and carbon black is preferably 95 to 140 parts by mass based on 100 parts by mass of the rubber component. The high filling of the filler such as silica and carbon black provides improved blister resistance, but when the blending amount of the filler is too large, the rigidity of the sealing material is too high, which may cause deteriorated low temperature resistance.

Carbon black is preferably spherical. When carbon black is closer to a true sphere (specific surface area is small), carbon black is less likely to aggregate, which is less likely to cause deteriorated low temperature resistance of the rubber composition for sealing material. From the viewpoint of reinforcing property, the particle size of carbon black is preferably small.

Carbon black may be conductive or non-conductive, and examples thereof include furnace black, channel black, acetylene black, Ketjen black, thermal black, and lamp black depending on the method of manufacturing the same. Carbon black may be used alone or as a mixture of two or more thereof.

As carbon black, for example, types such as SAF, ISAF, ISAF-HF, ISAF-LS, IISAF-HS, HAF, HAF-HS, HAF-LS, MAF, FEF, FEF-LS, GPF, GPF-HS, GPF-LS, SRF, SRF-HS, SRF-LM, FT, and MT can be used. Two or more carbon blacks having different particle sizes may be used.

The average particle size of carbon black may vary depending on the manufacturer, but for example, the average particle size is 19 nm in SAF, 23 nm in ISAF, 28 nm in HAF, 38 nm in MAF, 43 nm in FEF, 62 nm in GPF, 66 nm in SRF, and 122 nm in FT.

[E] Co-Crosslinking Agent

The rubber composition for sealing material preferably further contains a co-crosslinking agent. Examples of the co-crosslinking agent include quinone dioxime, ethylene glycol dimethacrylate, divinylbenzene, diallyl phthalate, triallyl isocyanurate, trimethylolpropane trimethacrylate, trimethylolpropane triacrylate, 1,2-polybutadiene, a metal methacrylate, and a metal acrylate. As the co-crosslinking agent, only one co-crosslinking agent may be used, or two or more co-crosslinking agents may be used in combination.

The content of the co-crosslinking agent in the rubber composition for sealing material is preferably 1 to 20 parts by mass, and more preferably 1 to 10 parts by mass, based on 100 parts by mass of the rubber component. Within this range, the fluidity and processability of the rubber composition for sealing material can be improved. Within this range, the blister resistance of the crosslinked sealing material can be further improved. When the content of the co-crosslinking agent is too small, the 100% tensile stress of the sealing material may decrease, and when the content is too large, the elongation at break is less than 100%, which may cause deteriorated low temperature resistance.

[F] Other Contained Components

The rubber composition for sealing material can contain components other than the above components as necessary.

Examples of the other contained components include additives such as fillers other than silica and carbon black (including an extender pigment and a coloring pigment), surfactants other than the silane coupling agent, antiaging agents, vulcanization accelerators, antioxidants, processing aids (stearic acid and the like), vulcanization aids (zinc oxide and the like), stabilizers, tackifiers, polyhydric alcohols, flame retardants, waxes, and lubricants. As the additive, only one additive may be used, or two or more additives may be used in combination.

When the rubber composition for sealing material contains the above additive, the content thereof may be an amount that is usually used in the art.

Examples of the filler include alumina, zinc oxide, titanium dioxide, clay, talc, diatomaceous earth, barium sulfate, calcium carbonate, magnesium carbonate, calcium oxide, mica, graphite, aluminum hydroxide, aluminum silicate, hydrotalcite, a particulate or powdery resin, a metal powder, a glass powder, and a ceramic powder.

Examples of the antiaging agent include phenol derivatives, aromatic amine derivatives, amine-ketone condensates, benzimidazole derivatives, dithiocarbamic acid derivatives, and thiourea derivatives.

Examples of the vulcanization accelerator include thiuram-based, thiazole-based, sulfenamide-based, thiourea-based, guanidine-based, and dithiocarbamate-based compounds.

Examples of the processing aid include thermoplastic resins, liquid rubbers, oils, softeners, internal mold release agents, and tackifiers. For example, when the rubber component is FKM or FFKM, a fluororesin or particles thereof may be contained as the filler, and a liquid fluororubber may be contained as the processing aid. When the rubber component is EPM or EPDM, for example, a paraffinic oil can be contained as the processing aid. The content of the processing aid is preferably 0.5 to 5 parts by mass, and more preferably 1.0 to 2.5 parts by mass, based on 100 parts by mass of the rubber composition for sealing material.

Examples of the internal mold release agent include higher fatty acids, fatty acid esters, fatty acid amides, fluororesins, silicone resins, and hydrocarbon resins. From the viewpoint of improving the low temperature resistance, the content of the internal mold release agent is preferably 0.5 to 5 parts by mass, and more preferably 1.0 to 2.5 parts by mass, based on 100 parts by mass of the rubber composition for sealing material. This is because when the content of less than 0.5 parts by mass causes a small mold release effect, which may cause a rubber to stick to a mold and contaminate the mold. The rubber composition for sealing material contains a high-viscosity internal mold release agent, whereby the low temperature resistance of the sealing material can be improved without deteriorating the blister resistance.

Examples of the surfactant other than the silane coupling agent include nonionic surfactants, and examples of the nonionic surfactant include higher alcohols and polyhydric alcohols. Specific examples of the polyhydric alcohol include diethylene glycol. When the polyhydric alcohol is contained, hydroxyl groups of silica are suppressed, which provides improved dispersibility and strength of silica.

As the crosslinking agent, sulfur, an organic sulfur compound, disulfide, and an organic peroxide and the like are used. Examples of the organic peroxide employed in EPDM and H-NBR include 2,5-dimethyl-2,5-di-t-butyl-peroxy-hexane-3, di-t-butyl peroxide, 2,5-dimethyl-2,5-di-t-butyl-peroxyhexane, t-butylcumyl peroxide, 1,3-bis(t-butylperoxy-isopropyl)benzene, dicumyl peroxide, 4,4-di-t-butylperoxy-butylvalerate, 2,2-di-t-butylperoxy-butane, 1,1-di-t-butylperoxy-3,3,5-trimethylcyclohexane, di-benzoyl peroxide, bis(o-methylbenzoyl)peroxide, bis(p-methylbenzoyl)peroxide, and t-butylperoxybenzylate.

The content of the crosslinking agent in the rubber composition for sealing material is usually 0.1 to 20 parts by mass, and preferably 0.2 to 10 parts by mass, based on 100 parts by mass of the rubber component. Within this range, the crosslinking reaction can sufficiently proceed, which makes it possible to provide a buffer material having excellent hardness, mechanical strength, and compression set resistance and the like, and excellent impact resistance.

When the rubber composition for sealing material contains an excessive filler in order to improve the blister resistance, the hardness of the sealing material increases, and the elongation thereof decreases, whereby the sealing material tends to be brittle. When the rubber composition for sealing material contains a plasticizer, these properties are improved, whereby the low temperature resistance are also improved. However, when the rubber composition for sealing material contains a large amount of the plasticizer, a plasticizer component is apt to be precipitated in the surface of a molded article, or the plasticizer component is apt to be extracted by a lubricant such as a grease. This accordingly causes a reduced volume, deteriorated low temperature resistance, and deteriorated heat resistance, which may cause deteriorated sealability. From such a viewpoint, preferably, the rubber composition for sealing material does not contain the plasticizer.

[Method for Manufacturing Sealing Material]

The rubber composition for sealing material can be prepared by uniformly kneading the above-mentioned contained components. For example, conventionally known kneading machines such as a mixing roller, a pressurized kneader, and an internal mixer (Banbury mixer) can be used. At this time, among the blending components, components other than a component contributing to crosslinking reaction (crosslinking accelerator, crosslinking retarder, and crosslinking agent and the like) may be first uniformly kneaded, followed by kneading the component contributing to the crosslinking reaction. A kneading temperature is, for example, around room temperature.

<Sealing Material>

The sealing material is composed of a crosslinked product of the rubber composition for sealing material described above. The sealing material can be produced by crosslinking (vulcanizing) and molding the rubber composition for sealing material. As the crosslinking/molding method, conventionally known methods such as injection molding, compression molding, and transfer molding can be employed.

A heating temperature (crosslinking temperature) during molding is, for example, about 100 to 200° C., and a heating time (crosslinking time) is, for example, about 0.5 to 120 minutes. When HNBR. EPDM, CR. FKM, or VMQ is used as the rubber component, secondary vulcanization is preferably performed.

The sealing material may be a packing or a gasket or the like. The shape of the sealing material is appropriately selected depending on the intended use thereof, and a typical example thereof is an O-ring having an O-shaped cross section. The sealing material has excellent low temperature resistance and blister resistance, whereby the sealing material can be suitably used as a sealing material of a storage tank for a storage high-pressure hydrogen gas of 80 MPa, for example. When not only a hydrogen gas but also, for example, an oxygen gas, a nitrogen gas, and a helium gas and the like are used as the storage high-pressure gas, the sealing material can be suitably used.

EXAMPLES

Hereinafter, the present invention will be described in more detail with reference to Examples; however, the present invention is not intended to be limited thereto.

[Evaluation of Physical Properties of Molded Article]

From a sheet-shaped sample for evaluation of physical properties produced to a thickness of 2 mm according to JIS K6250: 2006, a dumbbell-shaped No. 3 test piece was punched out according to JIS K6251: 2017. The test piece was pulled at 500 mm/min. and the tensile strength, elongation at break, and 100% tensile stress thereof were measured using a Schopper-type tensile tester. The hardness of the sheet-shaped sample for evaluation of physical properties was measured with a type A durometer hardness tester according to JIS K 6253: 2012. All these tests were conducted at a temperature of 25° C.

[High Temperature High Pressure Cycle Test of Sealing Material]

A sample for seal test molded into an O-ring was set on a flange, and a cycle test was performed under conditions shown in Table 1 to evaluate blister resistance. After the cycle test, the cross section of the O-ring was observed. A sealing material in which breakage was observed was evaluated as "B", and a sealing material in which no crack was observed was evaluated as "A". The presence or absence of gas leakage was detected under the conditions shown in Table 1. A sealing material in which gas leakage was detected was evaluated as "B", and a sealing material in which gas leakage was not detected was evaluated as "A".

TABLE 1

| | |
|---|---|
| Pressure increase rate | 2 MPa/s |
| Pressure decease rate | 100 MPa/s |
| Maximum pressure | 100 MPa |
| Minimum pressure | 0 MPa |
| Retention of maximum pressure | 1 s |
| Retention of minimum pressure | 1 s |
| Number of pressure cycles | 50 times |
| Temperature | 100° C. |
| Test fluid | Helium gas |

[Low-Temperature High-Pressure Cycle Test of Sealing Material]

A sample for seal test molded into an O-ring was set on a flange, and a cycle test was performed under conditions shown in Table 2. After the test, the cross section of the O-ring was observed. A sealing material in which breakage was observed was evaluated as "B", and a sealing material in which no crack was observed was evaluated as "A". The presence or absence of gas leakage was detected under the conditions shown in Table 2. The test was performed with or without a grease (Silicone grease manufactured by Shin-Etsu Chemical Co., Ltd., KF-96H-one million cSt) being applied to a seal part. A sealing material in which gas leakage was detected was evaluated as "B", and a sealing material in which gas leakage was not detected was evaluated as "A".

TABLE 2

| | |
|---|---|
| Pressure increase rate | 100 MPa/s |
| Pressure decease rate | 100 MPa/s |
| Maximum pressure | 100 MPa |
| Minimum pressure | 0 MPa |
| Retention of maximum pressure | 1 s |
| Retention of minimum pressure | 1 s |
| Number of pressure cycles | 50 times |
| Temperature | −40° C. |
| Test fluid | Helium gas |

[Preparation of Rubber Composition for Sealing Material and Production of Molded Article]

Components described in Table 3 were kneaded with a 10 L-pressurized kneader to prepare rubber compositions for sealing material of Examples and Comparative Examples. Each of the obtained rubber compositions for sealing material was placed in a mold heated to a temperature of 160 to 180° C., and molded by a pressurization press. A molding time was 5 to 20 minutes. Furthermore, secondary vulcanization was performed at a temperature of 160 to 180° C. for 0.5 to 2 hours to obtain samples for evaluation of physical properties and samples for seal test.

The normal state physical properties of the samples for evaluation of physical properties were measured according to the above evaluation method. The sealabilities of the samples for seal test at a high temperature and a low temperature were evaluated by performing the above cycle test. The results are shown in Table 3.

TABLE 3

| Composition | Example 1 | Example 2 | Example 3 | Comparative Example 1 | Comparative Example 2 | Comparative Example 3 | Comparative Example 4 |
|---|---|---|---|---|---|---|---|
| Rubber component A | 100.0 | — | — | 100.0 | — | — | — |
| Rubber component B | — | 100.0 | 100.0 | — | 100.0 | 100.0 | 100.0 |
| Vulcanization aid | 5.0 | 5.0 | 5.0 | 5.0 | 5.0 | 5.0 | 5.0 |
| Antiaging agent | 1.5 | 1.5 | 1.5 | 1.5 | 1.5 | 1.5 | 1.5 |
| Processing aid | 2.0 | 2.0 | 2.0 | 2.0 | 2.0 | 2.0 | 2.0 |
| Carbon black | 30.0 | 30.0 | 20.0 | 30.0 | — | 30.0 | 30.0 |
| Silica | 80.0 | 80.0 | 120.0 | 40.0 | 80.0 | 200.0 | 40.0 |
| Silane coupling agent | 3.0 | 3.0 | 3.0 | 3.0 | 3.0 | 3.0 | 3.0 |
| Polyhydric alcohol | 1.0 | 1.0 | 1.0 | 1.0 | 1.0 | 1.0 | 1.0 |
| Co-crosslinking agent | 5.0 | 5.0 | 5.0 | 5.0 | 5.0 | 5.0 | 5.0 |
| Crosslinking agent A | 0.5 | 0.5 | 0.5 | 0.5 | 0.5 | 0.5 | 0.5 |
| Crosslinking agent B | 8.0 | 8.0 | 8.0 | 8.0 | 8.0 | 8.0 | 8.0 |
| Total | 236.0 | 236.0 | 266.0 | 196.0 | 206.0 | 356.0 | 196.0 |
| <Normal state physical properties> | | | | | | | |
| Hardness (Shore A) | 93 | 90 | 92 | 79 | 83 | 95 | 78 |
| Tensile strength (MPa) | 14.0 | 13.8 | 14.8 | 12.5 | 16.1 | 10.8 | 11.9 |

TABLE 3-continued

| Composition | Example 1 | Example 2 | Example 3 | Comparative Example 1 | Comparative Example 2 | Comparative Example 3 | Comparative Example 4 |
|---|---|---|---|---|---|---|---|
| Elongation at break | 125 | 140 | 100 | 220 | 320 | 60 | 200 |
| 100% Tensile stress (MPa) | 13.0 | 9.0 | 14.8 | 4.6 | 4.1 | — | 4.8 |
| <High-temperature high-pressure cycle test> | | | | | | | |
| Breakage | A | A | A | B | B | B | B |
| Leakage | A | A | A | A | A | A | A |
| <Low-temperature high-pressure cycle test> | | | | | | | |
| Breakage | A | A | A | A | A | A | A |
| Leakage (with grease) | A | A | A | A | A | B | A |
| Leakage (no grease) | A | B | B | A | B | B | B |

Details of formulations in Table 3 are as follows. The units of blending amounts in Table are parts by mass.

[1] Rubber component A: Esprene 5361 (EPDM manufactured by Sumitomo Chemical Company, Limited: content of ethylene-derived structural unit: 49 mass %; content of 5-ethylidene-2-norbornene (ENB)-derived structural unit as diene monomer: 3.5 mass %; Mooney viscosity at 125° C. [ML(1+4) 125° C.] measured in accordance with JIS K 6300-1: 83).

[2] Rubber component B: Esprene 501A (EPDM manufactured by Sumitomo Chemical Company, Limited: content of ethylene-derived structural unit: 52 mass %; content of 5-ethylidene-2-norbornene (ENB)-derived structural unit as diene monomer: 4.0 mass %; and Mooney viscosity at 100° C. [ML(1+4) 100° C.] measured in accordance with JIS K 6300-1: 44)

[3] Vulcanization aid: two kinds of zinc oxides (manufactured by Hakusui Tech Co., Ltd.)

[4] Antiaging agent: NOCRAC 224S (2,2,4 trimethyl 1,2-dihydroquinoline copolymer manufactured by Ouchi Shinko Chemical Industrial Co., Ltd.)

[5] Processing aid: LUNAC S50V (Stearic acid manufactured by Kao Corporation)

[6] Carbon black: SEAST GSO (Furnace black manufactured by Tokai Carbon Co., Ltd.)

[7] Silica: sidistar (Spherical silica manufactured by Elkem, BET surface area: 20 m$^2$/g, CTAB adsorption specific surface area: 30 m$^2$/g, DBP absorption amount: 85 g/100 g, average particle diameter: 150 nm)

[8] Silane coupling agent: KBM1003 (Vinyltrimethoxysilane manufactured by Shin-Etsu Chemical Co., Ltd.)

[9] Polyhydric alcohol: Diethylene glycol (manufactured by Nippon Shokubai Co., Ltd.)

[10] Co-crosslinking agent: Hi-Cross M (Trimethylolpropane trimethacrylate manufactured by Seiko Chemical Co., Ltd.)

[11] Crosslinking agent A: Sulfur (Colloidal sulfur manufactured by Tsurumi Chemical Industry Co., Ltd.)

[12] Crosslinking agent B: PERKADOX 14-40 (40% bis(tert-butyldioxyisopropyl)benzene dilution, organic peroxide manufactured by Kayaku Akzo Co., Ltd.)

As shown in Table 3, in the samples for seal test of Example 1 to 3 obtained by crosslinking a rubber composition for seal material containing 50 to 140 parts by mass of silica, 1 to 20 parts by mass of a silane coupling agent, and 15 to 35 parts by mass of carbon black based on 100 parts by mass of a rubber component, no crack was observed in the cross section of the sample even when exposed to a high-temperature high-pressure environment, whereby the samples for seal test had excellent blister resistance. Gas leakage in the high-temperature high-pressure environment was also not confirmed, whereby the samples for seal test of Examples 1 to 3 were found to have excellent sealability at a high temperature. When the samples for seal test of Example 1 to 3 were tested by applying a grease in a low-temperature high-pressure environment, gas leakage was not confirmed, and the samples for seal test had excellent sealability at a low temperature. In the sample for seal test of Example 1 using EPDM which had more excellent cold resistance, gas leakage was not confirmed even if a grease was not applied at a temperature of −40° C., and a seal material having more excellent low temperature resistance than those of Examples 2 and 3 was found to be obtained.

Meanwhile, the samples for evaluation of physical properties of Comparative Examples 1, 2 and 4 had lower 100% tensile stress than that of Example 1 or 2, and the samples for seal test had blister generated in the high-temperature high-pressure cycle test. The sample for evaluation of physical properties of Comparative Example 3 had increased hardness, decreased tensile strength, and decreased elongation at break. The sample for seal test of Comparative Example 3 had blister generated in the high-temperature high-pressure cycle test, and deteriorated low temperature resistance.

REFERENCE EXAMPLE

In the same manner as in Example 1, rubber compositions for sealing material of Reference Examples 1 and 2 were prepared according to Table 4 to obtain samples for evaluation of physical properties. The normal state physical properties of the samples for evaluation of physical properties were measured according to the above evaluation method. The results are shown in Table 4.

TABLE 4

| Composition | Reference Example 1 | Reference Example 2 |
|---|---|---|
| Rubber component B | 100.0 | 100.0 |
| Vulcanization aid | 5.0 | 5.0 |
| Antiaging agent | 1.5 | 1.5 |
| Processing aid | 2.0 | 2.0 |
| Carbon black | 30.0 | 30.0 |
| Silica A | — | 80.0 |
| Silica B | 80.0 | — |
| Silane coupling agent | 3.0 | 3.0 |
| Polyhydric alcohol | 1.0 | 1.0 |
| Co-crosslinking agent A | 5.0 | — |
| Co-crosslinking agent B | — | 3.0 |

TABLE 4-continued

| Composition | Reference Example 1 | Reference Example 2 |
|---|---|---|
| Crosslinking agent A | 0.5 | 0.5 |
| Crosslinking agent B | 8.0 | 8.0 |
| Total | 236.0 | 234.0 |
| <Normal state physical properties> | | |
| Hardness (Shore A) | 94 | 91 |
| Tensile strength (MPa) | 11.2 | 16.8 |
| Elongation at break | 70 | 270 |
| 100% Tensile stress (MPa) | — | 6.8 |

Details of formulations in Table 4 are as follows. The units of blending amounts in Table are parts by mass.

[1] Rubber component B: Esprene 501A (EPDM manufactured by Sumitomo Chemical Company, Limited: content of ethylene-derived structural unit: 52 mass %; content of 5-ethylidene-2-norbornene (ENB)-derived structural unit as diene monomer: 4.0 mass %; and Mooney viscosity at 100° C. [ML(1+4) 100° C.] measured in accordance with JIS K 6300-1: 44)

[2] Vulcanization aid: two kinds of zinc oxides (manufactured by Hakusui Tech Co., Ltd.)

[3] Antiaging agent: NOCRAC 224S (2,2,4 trimethyl 1,2-dihydroquinoline copolymer manufactured by Ouchi Shinko Chemical Industrial Co., Ltd.)

[4] Processing aid: LUNAC S50V (Stearic acid manufactured by Kao Corporation)

[5] Carbon black: SEAST GSO (Furnace black manufactured by Tokai Carbon Co., Ltd.)

[6] Silica A: sidistar (Spherical silica manufactured by Elkem, BET surface area: 20 m$^2$/g, CTAB adsorption specific surface area: 30 m$^2$/g, DBP absorption amount: 85 g/100 g, average particle diameter: 150 nm)

[7] Silica B: AEROSIL 200 (manufactured by Nippon Aerosil Co., Ltd., BET surface area 200 m$^2$/g, hydrophilic fumed silica, average particle size: 7 to 40 nm)

[8] Silane coupling agent: KBM1003 (Vinyltrimethoxysilane manufactured by Shin-Etsu Chemical Co., Ltd.)

[9] Polyhydric alcohol: Diethylene glycol (manufactured by Nippon Shokubai Co., Ltd.)

[10] Co-crosslinking agent A: Hi-Cross M (Trimethylolpropane trimethacrylate manufactured by Seiko Chemical Co., Ltd.)

[11] Co-crosslinking agent B: TAIC (Triallyl isocyanurate manufactured by Nihon Kasei Co., Ltd.)

[12] Crosslinking agent A: Sulfur (Colloidal sulfur manufactured by Tsurumi Chemical Industry Co., Ltd.)

[13] Crosslinking agent B: PERKADOX 14-40 (40% bis(tert-butyldioxyisopropyl)benzene dilution, organic peroxide manufactured by Kayaku Akzo Co., Ltd.)

As compared with Example 2, the sample for evaluation of physical properties of Reference Example 1 containing silica B instead of silica A had increased hardness, decreased tensile strength, and decreased elongation at break, whereby the sample for evaluation of physical properties is expected to have poor blister resistance. The sample for evaluation of physical properties of Reference Example 2 containing the co-crosslinking agent B instead of the co-crosslinking agent A has lower 100% tensile stress than that of Example 2, and is expected to have poor blister resistance and low temperature resistance.

The invention claimed is:

1. A rubber composition for sealing material comprising:
100 parts by mass of a rubber component;
80 to 140 parts by mass of silica;
1 to 20 parts by mass of a silane coupling agent; and
15 to 35 parts by mass of carbon black,
wherein the rubber component is an ethylene-propylene-diene rubber and a content of ethylene-derived structural unit in the ethylene-propylene-diene rubber is greater than or equal to 45 mass % and less than or equal to 49 mass %.

2. The rubber composition for sealing material according to claim 1, wherein the ethylene-propylene-diene rubber has a Mooney viscosity of 50 to 90 at 125° C. or 30 to 60 at 100° C., the Mooney viscosity measured in accordance with JIS K 6300-1: 2013.

3. The rubber composition for sealing material according to claim 1, wherein the silica is spherical.

4. The rubber composition for sealing material according to claim 1, wherein the silica has an average particle size of 5 nm to 5 µm.

5. The rubber composition for sealing material according to claim 1, wherein the rubber composition for sealing material does not contain a plasticizer.

6. A sealing material comprising a crosslinked product of the rubber composition for sealing material according to claim 1.

* * * * *